United States Patent [19]

Jones

[11] Patent Number: 4,463,667
[45] Date of Patent: Aug. 7, 1984

[54] LOG BUNDLING APPARATUS

[76] Inventor: Merril Jones, General Delivery, Roberts Creek, B. C., Canada, V0N 2W0

[21] Appl. No.: 412,861

[22] Filed: Aug. 30, 1982

[30] Foreign Application Priority Data

Nov. 13, 1981 [CA] Canada .................................. 390068

[51] Int. Cl.³ ............................................. B65B 13/02
[52] U.S. Cl. ........................................ 100/2; 100/8; 414/745
[58] Field of Search ..................... 100/2, 7, 8; 414/745

[56] References Cited

U.S. PATENT DOCUMENTS

| 2,997,193 | 8/1961 | Dunham .......................... 414/745 X |
| 3,033,397 | 5/1962 | Busch . |
| 3,452,887 | 7/1969 | Larson et al. . |
| 3,452,888 | 7/1969 | Larson et al. . |
| 3,556,319 | 1/1971 | Holden .............................. 100/7 X |
| 3,971,309 | 7/1976 | Brodie .................................... 100/2 |

FOREIGN PATENT DOCUMENTS

| 98668 | 4/1940 | Sweden ................................... 100/7 |
| 137058 | 8/1960 | U.S.S.R. . |
| 540800 | 1/1977 | U.S.S.R. . |
| 582194 | 11/1977 | U.S.S.R. . |
| 587093 | 1/1978 | U.S.S.R. .................................. 100/2 |
| 703451 | 12/1979 | U.S.S.R. . |

Primary Examiner—Billy J. Wilhite
Assistant Examiner—Christine A. Peterson
Attorney, Agent, or Firm—Klarquist, Sparkman, Campbell, Leigh & Whinston

[57] ABSTRACT

This invention is directed to a method and apparatus for collecting and tying logs into bundles. The apparatus comprises: (a) elongated means suitable for extending under the tier of logs floating on the body of water; (b) means connected to means (a) for lifting means (a) and rolling the logs thereby lifted into a bundle of logs; (c) means associated with means (a) for strapping the circumference of the bundle of logs to hold them in bundle shape; and (d) means connected to means (a) for carrying and transporting means (a), (b) and (c) in combination.

21 Claims, 8 Drawing Figures

LOG BUNDLING APPARATUS

FIELD OF THE INVENTION

This invention is directed to a method and apparatus for collecting and tying logs into bundles. More particularly, this invention is directed to a method and apparatus which extends under a tier or raft of logs floating on a body of water and lifts and collects the logs so that they can be strapped into bundles for loading onto barges for shipment.

BACKGROUND OF THE INVENTION

Systems presently used on the west coast of British Columbia for collecting logs floating on a body of water comprise lassoing the logs in the water by means of steel cables and collecting them into bundles. This is usually done by a series of overhead steel cable rig lines strung between rig supports, and complementary steel cables which extend between the rig booms under the logs on the surface of the water.

In collecting the logs into bundles, the "belly" of the steel cables that extend under the surface of the water are moved to locations under floating tiers or rafts of logs. Stray logs, and clumps of logs, are "bulldozed" by one or more side winders into place over the "belly" of the cables extending under the water. Once the rafts and clumps of logs are in place, the steel cables are pulled taut to thereby collect and pull the logs into bundles for strapping with strap iron and loading onto a suitable shipping vessel.

A typical bundling machine is operated by Avalon Log Sort in Howe Sound, British Columbia. The bundling machine is mounted on a 40×90 wood barge equipped with two London two drum ship type cargo winches. An 80 ft. steel live boom is used for the purpose of pulling the bundling rigging out. The boom can be swung to the side while a tier of logs is pushed into place. However, hang-up problems with efficiency and smooth operation occur due to such things as the top line hanging up on tiers of logs while the boom is swung to the side and with the bottom line snagging on logs, etc., while the bundle is brought out of the water.

Also, problems occur from wheel wash created by the side winders. The wash causes log bundling band iron used for strapping bundles together to wrap and hang up on the bottom lines while placing a tier of logs in position. Raising the boom so that the side winder can go under the top line for the purpose of straightening up the tier does not solve the difficulty because the "belly" in the bottom line is then too shallow for placing the tier of logs.

Another problem which greatly reduces efficiency is that the wire cable bites into and holds the logs so that they cannot roll together snugly and evenly. Also, logs at angles in the tiers catch upon one another, and on the cables and this makes it impossible to turn out tight log bundles. A further problem is that after an eight hour shift, the bundling straps are kinked which further contributes to hang-ups.

This bundler is capable of putting out a bundle in six minutes provided there are no hang-ups. But the average is five bundles per hour because very few bundles go through without hang-ups.

Other problems associated with the present system using cables and rig booms, are that valuable wood in the outer logs of the bundle is damaged because the cable cuts into those outer logs. Moreover, as the logs are rolled against one another, bark rubs off the logs and drops to the bottom of the body of water. This causes environmental damage.

Further disadvantages are that the overhead cables, and cables extending under the water, represent a safety hazard to boats, pontoon equipped aircraft, and the like. Moreover, men working on the bundler sometimes get caught in the cables and are injured or thrown into the water.

The applicant is aware of the following patents which are considered relevant to this field of art.

| U.S. Pat. No. | Inventor |
| --- | --- |
| 3,033,397 | Busch |
| 3,452,887 | Larson |
| 3,452,888 | Larson |
| U.S.S.R. Patent No. | |
| 137,058 | |
| 582,194 | |
| 540,800 | |
| 703,451 | |

Some of the references disclose a separate cable which is used to collect logs that are fed to the cradle by mechanical jaws.

U.S.S.R. Pat. Nos. 582,194 and 540,800 demonstrate apparatus that operate on a fork lift principle where the bottom prongs must be pushed under the logs and then the top of the jaw crushes the logs into bundles.

U.S.S.R. Pat. No. 703,451 discloses the use of a multi-linkage jaw gripper to stack timber. The gripper is not suitable for operation in water. The jaws move above the logs in order to form the logs into bundles.

SUMMARY OF THE INVENTION

I have invented a log bundling apparatus which can be mounted on a suitable floating vessel, such as the front end of a barge, or even a tier or boom of logs. The apparatus has a longitudinal carriage which can be extended under a raft or tier of logs floating on the surface of a body of water. The carriage lifts the raft or tier of logs and by means of a rolling action works the logs into a tight bundle. The logs are then tied into a bundle by means of strong steel straps or cables.

The invention is directed to an apparatus for lifting a tier of logs from a body of water and rolling the logs into bundles comprising: (a) elongated means suitable for extending under the tier of logs floating on the body of water; (b) means connected to means (a) for lifting means (a) and rolling the logs thereby lifted into a bundle of logs; (c) means associated with means (a) for strapping the circumference of the bundle of logs to hold them in bundle shape; and (d) means connected to means (a) for carrying and transporting means (a), (b) and (c) in combination.

In the apparatus as defined, means (a) may be of unitary construction or it may be constructed in at least two sections, the two sections being pivotally connected to one another so that each section can be individually raised upwardly or lowered downwardly relative to one another. The apparatus can be mounted by means of a mounting member on a powered or unpowered floating carrier. The powered carrier can move the apparatus forwardly, backwardly or to each side, and can control the upward and downward movement of the two sections. With the unpowered carrier, the apparatus is stationary while the tiers of logs are pushed into place by side-winders or the like.

The apparatus may be pivotally connected to the mounting member secured to the floating carrier by means of a laterally extending horizontal axis whereby the apparatus can be tilted upwardly out of the water, or lowered downwardly into the water.

In the apparatus as defined, an elongated control means may be connected to the elongated means (a), may extend upwardly and outwardly from a point above the carrier-apparatus pivot point in the same general direction as means (a), and may be movable upwardly or downwardly relative to means (a) to thereby grip from above logs which are held on means (a).

The means (a) may be constructed in at least three sections, each section being pivotally connected in series to another section, each section being movable upwardly or downwardly relative to the other and independently of the other sections.

In the apparatus as defined, the separate pivotally connected together sections of the apparatus are moved upwardly or downwardly about the respective pivot points independently by means of cylinder-piston combinations positioned at each pivot point of the apparatus, each cylinder-piston unit being independently controlled. The section of means (a) that is pivotally connected to the mounting member is of a general "U" shape.

The invention is also directed to an apparatus for lifting a tier of logs from a body of water and rolling the logs together into bundles comprising: (a) elongated means for extending under the tier of logs floating on the body of water, the elongated means being constructed in at least two sections pivotally connected together in series, the sections being movable upwardly or downwardly relative to one another, separately or in unison; (b) mounting means connected to means (a) for carrying elongated means (a) and permitting means (a) to be pivotally moved upwardly or downwardly relative thereto; (c) elongated means extending upwardly and outwardly from a point above the pivot point connecting means (a) and means (b) in the same general direction as means (a).

In the apparatus as defined, the section of elongated means (a) that is pivotally connected to mounting means (b) may be of a general "U" shape, the pivot point being located at some point in the curved portion of the "U".

The invention is also directed to a method of collecting a tier of logs floating on a body of water and lifting and rolling the tier of logs into a bundle, the method comprising extending an elongated means under the tier of logs on the water, lifting the logs from the water, rolling the logs together along the elongated means so that the logs roll into a closely fitting bundle of logs, and strapping the circumferences of the logs by suitable strapping means to secure the log bundle.

In the method as defined, the elongated means may be pivotally mounted on a floating carrier and contructed in at least two sections which are pivotally attached to one another, whereby the section remote from the floating carrier can be upwardly raised before the section proximate to the floating carrier so as to initiate log rolling action of the logs of the log tier remote from the carrier so that they are rolled unto the logs resting on the section of the elongated means proximate to the carrier.

In the method as defined, the two or more sections may be pivotally attached to the floating carrier along a horizontal laterally extending axis so that the sections can be tilted entirely out of the water toward the carrier thereby causing the logs to roll together in a tight bundle.

DETAILED DESCRIPTION OF THE INVENTION

My apparatus can be constructed in various embodiments, but three embodiments are of particular utility. The apparatus is designed to collect bundles of logs in six, ten or fourteen cunit size. The apparatus used to collect logs and form them into log bundles can be constructed to have single, double, triple, or two component, two stage roll mechanisms as the logs are collected and rolled together into a bundle. An advantage of my apparatus is that the logs are rolled together to form tighter, neater bundles than is possible when the logs are simply pulled or crushed together as is common with current log collecting and bundling techniques using steel cables.

My log bundling apparatus can be removably mounted on a suitable floating vessel such as a steel barge. The apparatus has a longitudinally extending carriage which somewhat resembles a large hand. The carriage extends under the surface of the water, under the raft or tier of logs, and then by a tipping action toward the floating carrier rolls the logs toward the carrier and ultimately into a tight bundle. An advantage with my log bundling apparatus is that only three men are required to operate it, that is, a barge operator, a log strapper, and a side winder operator.

Figures 1, 2, 3:
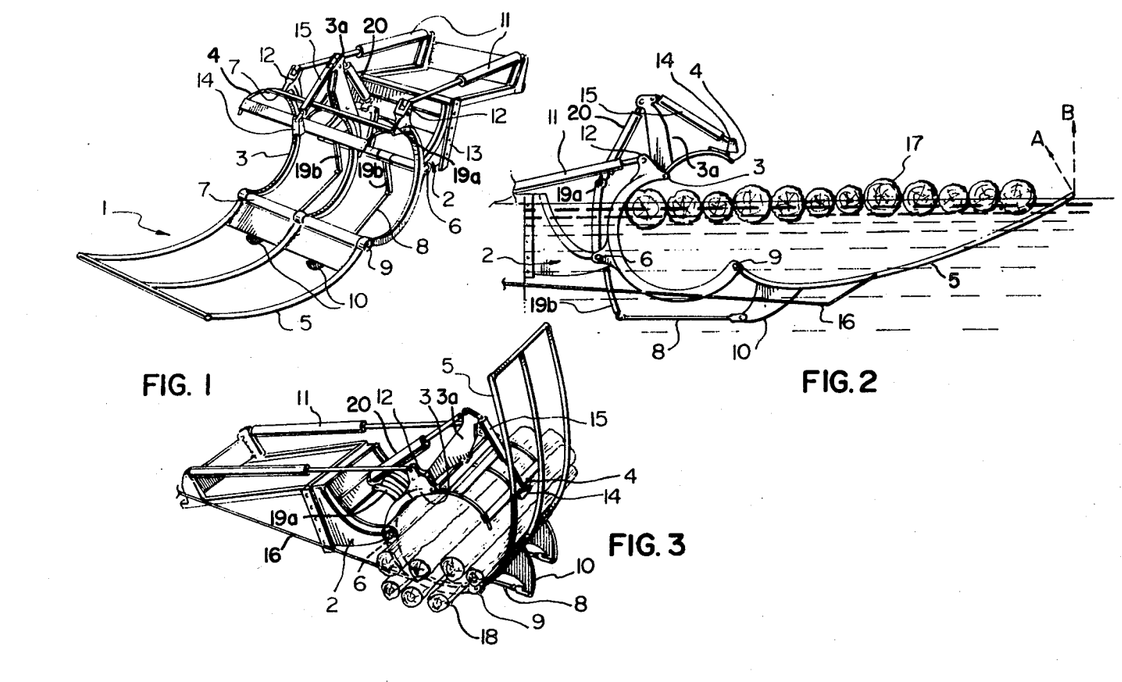
FIG. 1 represents a three dimensional perspective view of the log bundling apparatus with two component, two stage independent or cooperative log rolling action.
FIG. 2 represents a side elevation view of the two component, two stage independent or cooperative log bundling apparatus.
FIG. 3 represents a side elevation view of the apparatus depicted in FIG. 2 in closed position embracing a bundle of logs.

FIG. 1 demonstrates a three-dimensional perspective view of a log bundling apparatus with two independent interacting components, the log lifting portion being constructed to have a two stage log roll. The log bundling apparatus 1 is basically constructed of a mounting member 2, a first stage collector frame 3, an independently pivotal control frame 4, a second stage roll frame 5 and a lateral pivot and bearing shaft 6. Cross supports 7 provide lateral strength to the overall roll frame and log gripper combination.

The mounting member 2 can be attached suitably to a powered floating vessel, such as a barge or other suitable carrier, by means of welding, bolts, clamps, or the like.

The first stage collector frame 3 is hingedly connected by means of hinges 9 to the second stage roll frame 5. The second stage roll frame 5 can be moved in a pivotal direction upwardly or downwardly about the hinges 9 relative to the first stage jaw frame 3. This is done by means of a pair of connecting rods 8, extending beneath the collector frame 3. The pair of connecting rods 8 are each connected at one end to respective connectors 10 which are rigidly secured to the second roll frame 5. The pair of connecting rods 8 are each connected pivotally at the opposite ends to the downwardly extending pair or lower control arms 19b of control frame 19a.

Control frame 19a, as shown best in FIG. 1, connects with lateral pivot shaft 6, and can pivot thereon. Control frame 19a has lateral extensions along pivot shaft 6 from which the pair of control arms 19b extend downwardly. The pair of connecting rods 8 at their ends opposite to respective connectors 10 connect to the lower ends of respective arms 19b. The middle member of first stage jaw frame 3 includes an upper extension 3a which extends upwardly a greater distance than either of the outside members of collector frame 3. A second stage roll frame control cylinder 20 is connected between the upper end of upper extension 3a and the upper end of control frame 19a. By means of these compartments, and extending of contracting control cylinder 20, control frame 19a is pivoted about pivot shaft 6, which in turn by means of connecting rods 8 functions to raise or lower roll frame 5 about pivot connection 9 relative to collector frame 3.

The collector frame 3 is pivotally rotatable about lateral pivot shaft 6. The frame 3 is curved through approximately 180° so that at its upper end, it extends again in the general direction of frame 5.

The entire roll frame, including jaw frame 3 and roll frame 5, can be moved pivotally upwardly or downwardly relative to mounting member 2 about lateral pivot shaft 6 by means of a pair of main frame piston-cylinder moving means 11. The piston ends of the pair of piston-cylinder moving means 11 are respectively connected to a pair of cylinder connectors 12 while the cylinder ends of the pair of piston-cylinder moving means 11 are connected to the mounting member 2 by means of a pair of main piston-cylinder hinge supports 13 (only one shown in FIG. 1).

Linking laterally the two top portions of control frame 4 is a crosspiece 14. A control frame piston-cylinder moving means 15 is pivotally connected to crosspiece 14 and at its other end to frame 3a. This piston-cylinder moving means 15 can be used to pivot control frame 4 about a shaft positioned at the top of frame 3 independently of jaw frame 3, while piston-cylinder means 20 and connecting rods 8 move frame 5 upwardly or downwardly independently of jaw frame 3.

Logs bundled using my method and apparatus are more tightly bundled than is possible with present systems. The log rolling action that occurs as the logs are lifted and rolled using my apparatus, encourages and allows the logs to align with one another and fall into their own parallel lay pattern, thereby enabling them to fit together more snugly. No cables which bite into the logs and hold them from aligning with one another are used. Snags between logs from branch stumps and angled logs which in combination with cable bite tend to prevent the logs from achieving a tight parallel pattern are greatly reduced. Also damage to the logs is minimized since there is negligible cable bite and the logs are not simply forced together into a tight pattern.

The radius of the arc traced by the end of frame 5 removed from frame 3 is shorter when frame 5 is moved by control frame 4 and connecting rods 8, than when frame 5 and frame 3 in combination are pivoted about shaft 6. The shorter radius arc is represented by arc A in FIG. 2 while the latter is represented by arc B in FIG. 2. Arc A is very useful for initiating the log lift and encouraging the logs to roll over one another to form a snug bundle. Arc B is the longer radius arc and is used when the entire log bundling apparatus is to be raised for log bundling and log bundle dispensing purposes.

FIGS. 2 and 3 show in sequence by means of side elevation view the method employed to collect a tier of logs 17 and roll them into a bundle 18. The band iron 16 used to secure the bundle of logs 18 together is initially strung between frame 5 to mounting member 2 and is removed by a workman to tie the bundle 18 once the logs are rolled into a bundle.

By means of suitable hydraulic hose connections, and separate operating controls (not shown) for each piston-cylinder combination, first stage roll frame 5 can be moved individually upwardly or downwardly according to arc A or B relative to jaw frame 3 and/or control frame 4. The advantage of the construction shown in FIGS. 1, 2 and 3 is that the hydraulic hoses are positioned above water, which greatly reduces corrosion difficulties which are a continuing problem in a salt water environment.

Thus, in operation, when the entire assembly including the mounting member 2 is mounted on a suitable floating carrier, such as a barge, and accompanied with a powered side winder, and respective hydraulic controls and hoses are hooked up individually to each piston-cylinder means, it can be used with an operator to efficiently gather logs floating on the surface of the water and rolling them into bundles 18.

Figure 4:
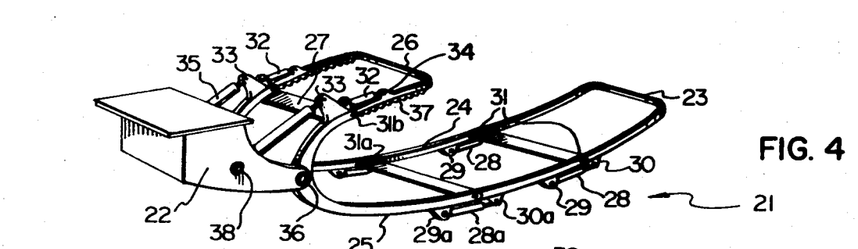
FIG. 4 represents a three dimensional perspective view of the log bundling apparatus with three stage log rolling action.

FIG. 4 shows a three stage log rolling carriage and a pivotable upper log gripper. The log bundling apparatus 21 is basically constructed of a mounting member 22, a first stage roll frame 23, a second stage roll frame 24, a third stage roll frame 25 and an upper log gripper 26. Three cross supports 27 provide lateral strength to the overall roll frame and log gripper combination.

The mounting member 22 can be attached suitably to a powered floating vessel, such as a barge or other suitable carrier, by means of welding, bolts, clamps, or the like.

The first stage roll frame 23 is hingedly connected by means of a pair of hinges 31 to the second stage roll frame 24. The first stage roll frame 23 can be moved in a pivotal direction upwardly or downwardly about the pair of hinges 31 relative to the second stage roll frame 24. This is done by means of a pair of first stage piston-cylinder frame moving means 28, mounted on each under side of the first stage roll frame 23, so as to span underneath the respective hinge 31. The first stage moving means 28 is connected at each end to respective frame 23 and frame 24 by means of a first stage frame cylinder support 29 and a first stage frame piston support 30.

In turn, the second stage roll frame 24 is pivotally connected through a vertical plane to the third stage roll frame 25 about the pair of hinges 31a. As with first roll stage 23, pivotal movement is controlled and caused by means of a pair of second stage piston-cylinder frame moving means 28a, connected respectively to a pair of second stage frame cylinder supports 29a and second stage frame piston supports 30a.

The third stage roll frame 25 is connected at one end to frame 24 and curves upwardly through almost 180° so that at its upper end, it extends again in the general direction of frame 23 and is hingedly connected by means of a pair of hinges 31b, to an overhead log gripper 26. Log gripper 26 can be pivotally moved upwardly or downwardly relative to the connecting upper portion of the third stage roll frame 25 by means of a pair of piston-cylinder gripper moving means 32. These are secured respectively to the upper portion of the third stage roll frame 25 and the overhead log gripper 26 by means of a pair of gripper cylinder supports 33 and a pair of gripper piston supports 34.

The entire roll frame, including overhead log gripper 26, can be moved pivotally upwardly or downwardly relative to mounting member 22 about main frame hinge 36, by means of a pair of main frame piston-cylinder moving means 35. The piston ends of the pair of piston-cylinder moving means 35 are respectively connected to a pair of gripper cylinder supports 33 while the cylinder ends of the pair of piston-cylinder moving means 35 are connected to the mounting member 22 by means of a pair of main piston-cylinder hinge supports 38.

Optionally, the under surface of overhead log gripper 26 can be fitted with a series of serrations 37, thereby enabling the overhead log gripper 26 to have more gripping action on the logs assembled within the roll frame.

By means of suitable hydraulic hose connections, and separate operating controls (not shown) for each piston-cylinder combination, first stage roll frame 23 can be moved individually upwardly or downwardly relative to second stage roll frame 24, second stage roll frame 24 can be moved separately upwardly or downwardly relative to third stage roll frame 25, overhead log gripper 26 can be moved individually upwardly or downwardly relative to the upper portion of the third stage roll frame 25, and the entire roll frame and log gripper assembly can be pivotally moved individually and separately in an upwardly or downwardly direction relative to mounting member 22.

Thus, in operation, when the entire assembly including the mounting member 22 is mounted on a suitable floating carrier, such as a barge, and respective hydraulic controls and hoses are hooked up individually to each piston-cylinder means, it can be used efficiently to gather logs floating on the surface of the water and rolling them into bundles. This is done by moving the first, second and third stages of the roll frames under a raft of logs floating on the surface of the water, and then, in an action resembling the action of the human hand, curl the roll frame assembly upwardly and inwardly towards the mounting member 22. This action lifts and rolls the logs together into a tight bundle. Angled logs, by means of the rolling action, tend to align parallel to the other logs. Snags are also broken by the rolling action.

Figure 5:
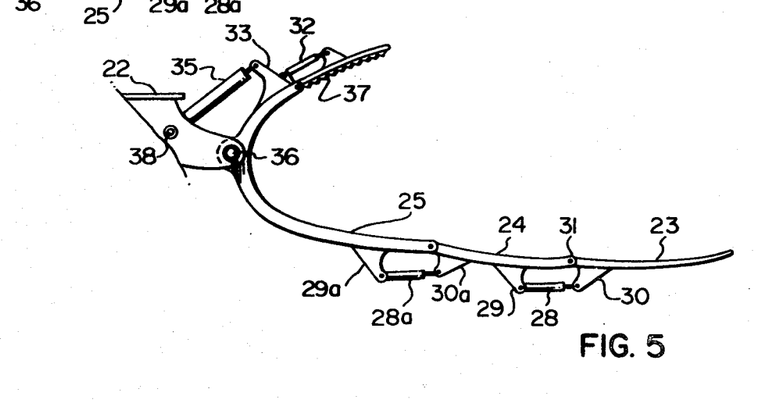
FIG. 5 represents a side elevation view of the three stage log bundling apparatus.

Not shown in FIG. 5 are a pair of steel cables or straps that are positioned or strung along each side of the first, second and third stage roll frames. These steel cables or straps are removed from the sides of the roll frame assembly and cinched tightly about the circumference of the log bundles according to known techniques, once the logs are rolled together into a tight secure bundle.

The log bundling apparatus is designed so that there are no obstructions to the smooth operation of a normal side winder which is used to push a tier or raft of logs into position above the roll frame when it extends under the surface of the water under the logs. Once the logs are pushed by the side winder tight against one another, the roll frame is curled upwardly and inwardly so that the logs in the tier are held and at the same time rolled together over the upper surfaces of the first, second and third stages of frame into a bundle of logs. Meanwhile, the side winder can be used to push the ends of the logs into even alignment with one another. The curling action provided by the three stages of the roll frame helps to hold the logs as they are being rolled into a bundle. The entire frame assembly is also tilted upwardly about pivot 36 to assist in holding and bundling the logs together. Additional holding action is provided by gripper 26. Overhead log gripper 26 is pivotally movable upwardly or downwardly to grip the top surfaces of the logs.

Upwardly or downwardly tilting movement of the entire roll frame and log gripper assembly so as to cause the logs to roll down the roll frame into a tight bundle immediately in front of the main frame hinge 36 is controlled by main frame piston-cylinder moving means 35. This action assists in rolling the logs into a neat and tight bundle, for subsequent strapping.

The log bundling apparatus is equipped with power sufficient that the overall roll frame assembly, and the tipping mechanism provided by the main frame piston-cylinder moving means 35, can operate quickly, notwithstanding the substantial weight placed upon the roll frame by the logs. This rapid rolling and tilting action not only ensures that the logs roll rapidly into a bundle and are snugly juxtapositioned to one another, but that a high rate of bundles are produced.

Once the bundle of logs are rolled into a tight pattern, the bundle is strapped or bound at two locations by means of two steel straps or cables which are tightly cinched about the circumference of the bundle at those two locations. Once the bundle is tightly cinched together by means of the straps or cables, the overall frame assembly is quickly tilted downwardly, so that the various components of the roll frame extend under the surface of the water, and the bundle is then ejected from the roll frame and floats away on the surface of the water. Alternatively, the secured log bundle can be loaded on a suitable carrier. In either case, the side winder can then push the next tier of logs into position for rolling into a tight bundle of logs.

This log bundling apparatus will efficiently produce about twelve to fifteen bundles of logs per hour, a rate which is about two to three times as good as conventional log bundling systems.

A significant advantage of the construction of the log bundling apparatus is that it has no rough edges or protrusions which tend to get in the way or obstruct the efficient and smooth rolling action of the apparatus as the logs are gathered and rolled into bundles. Moreover, the upward curvature of the frames is carefully designed to promote log rolling and high strength so that no undue stresses are concentrated on any point of the frame.

Another advantage of the log bundling apparatus is that it can be mounted on a suitable floating carrier and hence can be moved easily from one log booming ground to another. No blocks, tail holts for swinging booms, or strings of wire cable must be disassembled or taken down in order to move the apparatus to another log booming site. Also, since it is impossible to tow a side winder at any speed through the water, two side winders can be driven up onto the roll frame of the bundling apparatus and lifted out of the water for the purpose of moving the bundling apparatus and the two side winders together to the next log booming ground.

Figures 6, 7, 8:
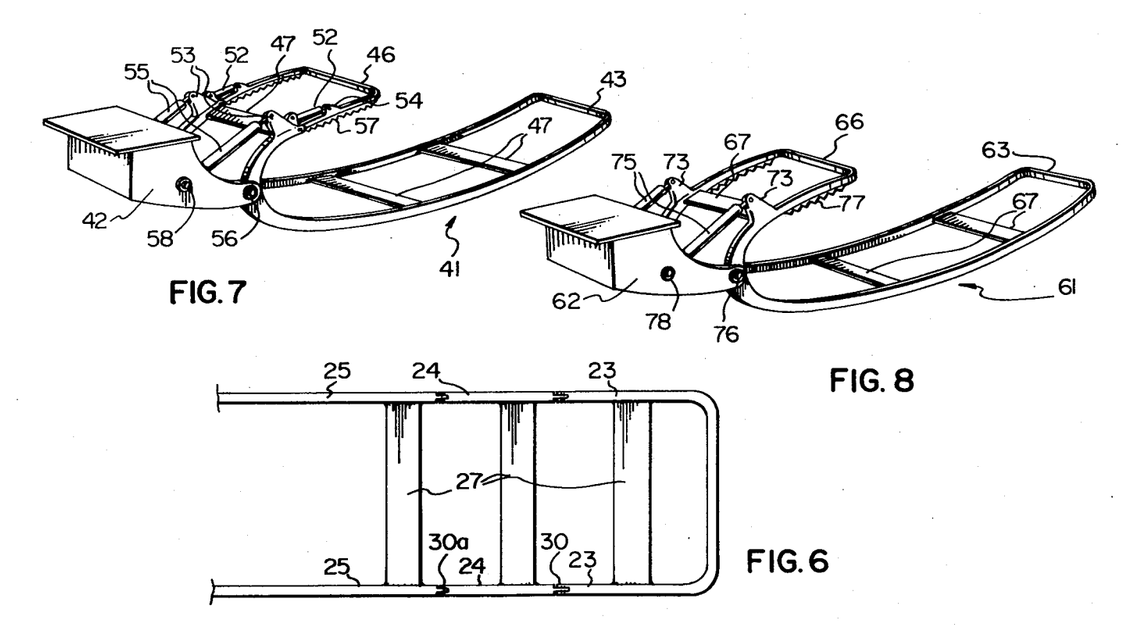
FIG. 6 represents a top elevation view of the three stage log bundling apparatus.
FIG. 7 represents a three dimensional perspective view of a log bundling apparatus with unitary log rolling action.
FIG. 8 represents a three dimensional perspective view of a log bundling apparatus with unitary log rolling action and rigid top log gripper.

FIG. 7, depicts a single stage log bundling apparatus that is especially designed to turn out 6 cunit size log bundles, although it can be used for larger size bundles as well. It does not have individually operating first, second and third stage roll frames. The entire roll frame 43 is constructed as one unit and log bundles are produced by rolling the logs together into a bundle mainly by the upward tilting action of the entire roll frame utilizing the main frame piston-cylinder moving means 55. The log bundling apparatus 41 depicted in FIG. 7 is in many respects similar in construction to the three roll stage 10 cunit size bundling apparatus depicted in FIGS. 4, 5 and 6. The entire frame 43 and 44 pivots about hinge 56 and is controlled by means 55, which is used in pairs and is mounted between hinge support 58 and cylinder support 53. The overhead log gripper 46 is pivotally movable relative to the main frame and is controlled by the pair of piston-cylinders 52.

FIG. 8 illustrates an apparatus 61 which is constructed in fundamentally the same way as the apparatus shown in FIG. 7 except that the overhead log gripper 66 is fixed in position relative to the rest of the frame 63. This simpler less costly construction may be desirable in certain applications.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

The embodiments of the invention in which an exclusive property or privilege is claimed are defined as follows:

1. An apparatus for collecting a plurality of logs floating on a body of water and rolling the logs into a bundle comprising:
   (a) elongated means suitable for extending under the plurality of logs floating on the body of water;
   (b) means connected to elongated means (a) for lifting elongated means (a) and the logs thereon and rolling the logs into a bundle of logs;
   (c) means connected to lifting means (b) for carrying and transporting elongated means (a) and lifting means (b) in combination; and
   (d) means connected to elongated means (a) whereby when it is moved, at least an outer portion of elongated means (a) pivots upwardly or downwardly about a shorter radius of curvature than when elongated means (a) is moved solely by lifting means (b).

2. An apparatus as defined in claim 1 including means associated with means (a) for strapping the circumference of the bundle of logs to hold them in a bundle.

3. An apparatus as defined in claim 1 wherein means (a) can be moved independently of means (b), in unison with means (b), independently of means (d), in unison with means (d), or according to any combination of these movements.

4. An apparatus as defined in claim 3 or 1 wherein means (a) is curved upwardly along its length to promote log rolling action.

5. An apparatus for lifting a tier of logs from a body of water and rolling the logs into bundles comprising in combination:
   (a) an elongated upwardly curved frame;
   (b) a generally curve shaped frame being pivotally attached at one end thereof along a laterally extending horizontal axis to frame (a);
   (c) a supporting member pivotally connected along a laterally extending horizontal axis to a mid-point of frame (b);
   (d) a generally curve shaped frame being pivotally connected at a mid-point to member (c) about the same axis as frame (b);
   (e) a linkage means movably connecting frame (a) with frame (d);
   (f) means connected to frame (b) at the end opposite to that connected to frame (a) for pivoting frame (b) about the laterally extending horizontal axis; and
   (g) means connected to frame (d) at the end opposite to the end connected to linkage means (e) for pivoting frame (d) about the laterally extending horizontal axis.

6. An apparatus as defined in claim 1 wherein means (a) is of unitary construction.

7. An apparatus for collecting a plurality of logs from a body of water and
   (a) elongated means suitable for extending under the plurality of logs floating on the body of water;
   (b) means connected to means (a) for lifting means (a) and the logs thereon and rolling the logs into a bundle of logs;
   (c) means associated with means (a) for strapping the circumference of the bundle of logs to hold them in a bundle;
   (d) means connected to means (b) for carrying and transporting means (a), (b) and (c) in combination; and wherein means (a) is constructed in two sections being pivotally connected to one another so that each section can be individually raised upwardly or lowered downwardly relative to one another.

8. An apparatus as defined in claim 7 wherein the apparatus is mounted by means of a mounting member on a powered floating carrier, which can move the apparatus forwardly, backwardly or to each side, and can control the upward and downward movement of the two sections.

9. An apparatus as defined in claim 7 wherein the apparatus is pivotally connected to the mounting member secured to a floating carrier by means of a laterally extending horizontal axis whereby means (a), (b) and (c) can be tilted upwardly out of the water, or lowered downwardly into the water.

10. An apparatus as defined in claim 9 wherein elongated control means (c) is connected to the elongated means (a), extends upwardly and outwardly from a point above the carrier-apparatus pivot point in the same general direction as means (a), and is movable upwardly or downwardly relative to means (a) to thereby grip from above logs which are held on means (a).

11. An apparatus as defined in claim 10 wherein the means (a) is constructed in at least three sections, each section being pivotally connected in series to 5 another section, each section being movable upwardly or downwardly relative to the other and independently of the other sections.

12. An apparatus as defined in claim 11 wherein the separate pivotally connected together sections of the apparatus are moved upwardly or downwardly about the respective pivot points independently by means of cylinder-piston combinations positioned at each pivot point of the apparatus, each cylinder-piston unit being independently controlled.

13. An apparatus as defined in claim 12 wherein the section of means (a) that is pivotally connected to the mounting member is of a general "C" shape.

14. An apparatus for lifting a tier of logs from a body of water and rolling the logs together into bundles comprising:
(a) elongated means for extending under the tier of logs floating on the body of water, the elongated means being constructed in at least two sections pivotally connected together in series, the sections being movable upwardly or downwardly relative to one another, separately or in unison; and
(b) mounting means connected to means (a) for carrying elongated means (a) and permitting means (a) to be pivotally moved upwardly or downwardly relative thereto; either in unison or each section independently.

15. An apparatus as defined in claim 14 wherein elongated means extending upwardly and outwardly from a point above the pivot point connecting means (a) and means (b) in the same general direction as means (a) are connected to either means (a) or means (b).

16. An apparatus as defined in claim 14 wherein the section of the elongated means (a) that is pivotally connected to mounting means (b) is of a general "U" shape, the pivot point being located at some point in the curved portion of the "U".

17. An apparatus as defined in claim 1 including elongated control means connected to means (a), said control means extending outwardly in the same direction as means (a) at a level above the lowermost portion of means (a) and being movable upwardly or downwardly relative to means (a) to thereby grip from above logs held on means (a).

18. A method of collecting a tier of logs floating on a body of water and lifting and rolling the tier of logs into a bundle, the method comprising extending an elongated means under the tier of logs on the water, rolling the logs together along the elongated means so that the logs roll into a closely fitting bundle of logs, and strapping the circumferences of the logs by suitable strapping means to secure the log bundle, the elongated means being pivotally mounted on a floating carrier and being constructed in at least two sections which are pivotally attached to one another, whereby the section remote from the floating carfier can be upwardly raised prior to the section proximate to the floating carrier so as to initiate log rolling action of the logs of the log tier floating on the water.

19. A method as defined in claim 18 wherein the two or more sections are pivotally attached to the floating carrier along a horizontal laterally extending axis so that the sections can be tilted entirely out of the water toward the carrier thereby causing the logs to roll together in a tight bundle.

20. A method as defined in claim 18 wherein a second elongated means extends over the logs and water in the same direction as the first elongated means extending under the logs, the second elongated means being pivotally mounted so as to enable it to move and assist in bundling the logs on the first elongated means.

21. A method as defined in claim 20 wherein the second elongated means can be used to hold a partial bundle of logs in place while the first elongated means extends under further logs which are gathered to complete the bundle of logs.

* * * * *

UNITED STATES PATENT AND TRADEMARK OFFICE
CERTIFICATE OF CORRECTION

PATENT NO. : 4,463,667
DATED : August 7, 1984
INVENTOR(S) : Merril Jones

It is certified that error appears in the above-identified patent and that said Letters Patent are hereby corrected as shown below:

Column 5, line 12 change "or" to --of--;

Column 5, line 27 change "compartments" to --components--;

Column 5, line 27 "of" should be --or--;

Column 10, line 30 after "and" insert --rolling the logs into a bundle comprising--;

Column 10, line 59 delete "(c)";

Column 10, line 68 delete "5".

Signed and Sealed this

Fifteenth Day of January 1985

[SEAL]

Attest:

*Attesting Officer*

GERALD J. MOSSINGHOFF

*Commissioner of Patents and Trademarks*